US006536809B2

(12) United States Patent
Marty et al.

(10) Patent No.: US 6,536,809 B2
(45) Date of Patent: Mar. 25, 2003

(54) PIVOTING SLEEVE ASSEMBLY

(75) Inventors: Garry Marty, Fishers, IN (US); Gerald McNerney, Carmel, IN (US); Scott Jones, Carmel, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 09/927,955

(22) Filed: Aug. 10, 2001

(65) Prior Publication Data

US 2002/0105186 A1 Aug. 8, 2002

Related U.S. Application Data

(60) Provisional application No. 60/266,607, filed on Feb. 6, 2001.

(51) Int. Cl.[7] .................................................. F16L 27/04

(52) U.S. Cl. .......................... 285/261; 285/46; 285/271

(58) Field of Search .......................... 285/46, 261, 264, 285/271, 272, 273, 275, 263; 239/587.1–587.5, 588

(56) References Cited

U.S. PATENT DOCUMENTS

| | | | | | |
|---|---|---|---|---|---|
| 1,597,477 | A | * | 8/1926 | Panhorst | 285/263 |
| 1,714,563 | A | * | 5/1929 | Kiel | 285/263 |
| 3,582,114 | A | * | 6/1971 | Andersen | 285/263 |
| 4,035,004 | A | * | 7/1977 | Hengesbach | 285/261 |
| 4,088,348 | A | * | 5/1978 | Shemtov | 285/184 |
| 4,298,219 | A | | 11/1981 | Amelink | |
| 4,443,030 | A | | 4/1984 | Hairston et al. | |
| 4,489,962 | A | * | 12/1984 | Caumont et al. | 285/263 |
| 4,706,998 | A | * | 11/1987 | Peppel et al. | 285/146.3 |
| 5,160,176 | A | | 11/1992 | Gale | |
| 5,299,838 | A | | 4/1994 | Yang | |
| 5,332,267 | A | | 7/1994 | Harrison | |
| 5,353,447 | A | * | 10/1994 | Gravatt | 239/587.1 |
| 5,415,439 | A | | 5/1995 | Wells | |
| 5,657,496 | A | * | 8/1997 | Corb et al. | 239/587.1 |
| 5,658,022 | A | | 8/1997 | Shi et al. | |
| 5,975,588 | A | | 11/1999 | Hesseln et al. | |
| 6,123,274 | A | * | 9/2000 | Perdreau et al. | 239/581.1 |
| 6,264,122 | B1 | * | 7/2001 | Perdreau et al. | 239/587.4 |
| 6,269,495 | B1 | * | 8/2001 | Sondrup | 285/261 |
| 6,322,004 | B1 | * | 11/2001 | Perdreau et al. | 239/587.4 |

* cited by examiner

*Primary Examiner*—Lynne H. Browne
*Assistant Examiner*—Aaron Dunwoody
(74) *Attorney, Agent, or Firm*—Kwadjo Adusei-Poku; Lloyd D. Doigan

(57) ABSTRACT

A pivoting sleeve assembly for aligning a fluid delivery device perpendicular to a mounting surface when the fluid delivery device is mounted to a wall, the pivoting sleeve assembly made up of a fluid delivery device housed within a sleeve, the sleeve having a lower tubular portion and an upper arcuate portion, and an annular pivot ring, the inner surface thereof having an arcuate shape to conform to the shape of the upper arcuate portion of the sleeve, so that the sleeve may pivot within the contours of the pivot ring. This allows the sleeve to orient the fluid delivery device for proper mounting to the surface.

18 Claims, 16 Drawing Sheets

35
34
30
37
32
66
51
65
70
80
94
50
80
69
67
90
44
67
40
20
42
45
62
60
49

34
37
30
32
65
51
70
50
80
80
69
80
90
67
44
95
40
42
45
46
60
49

Figure - 18
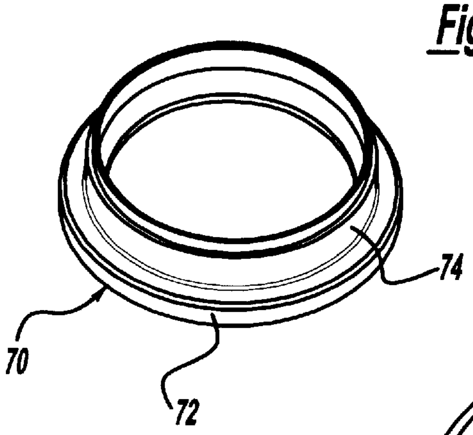
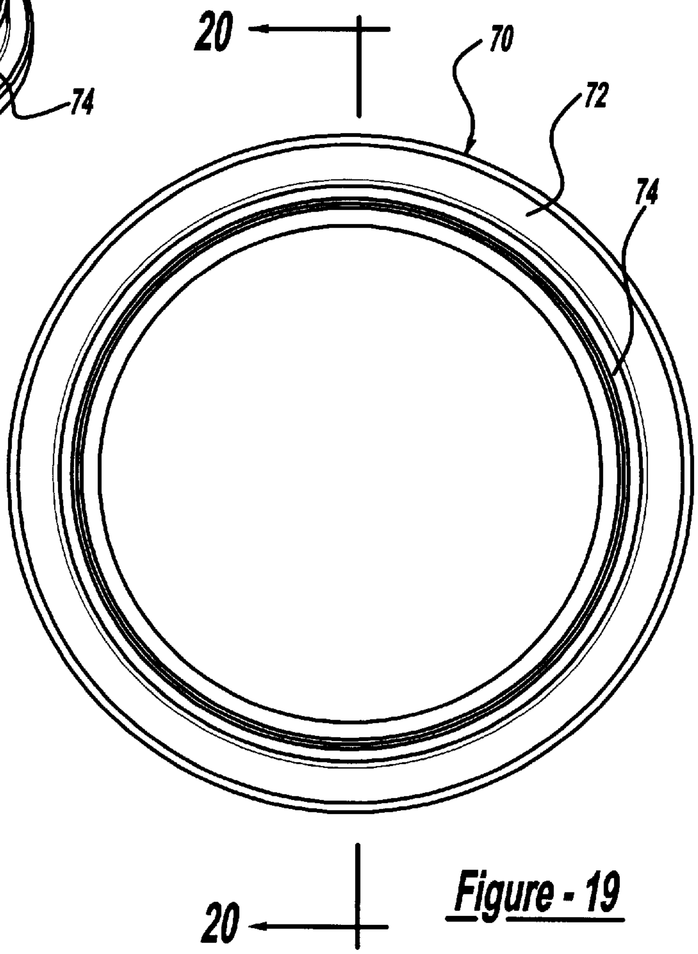
Figure - 19
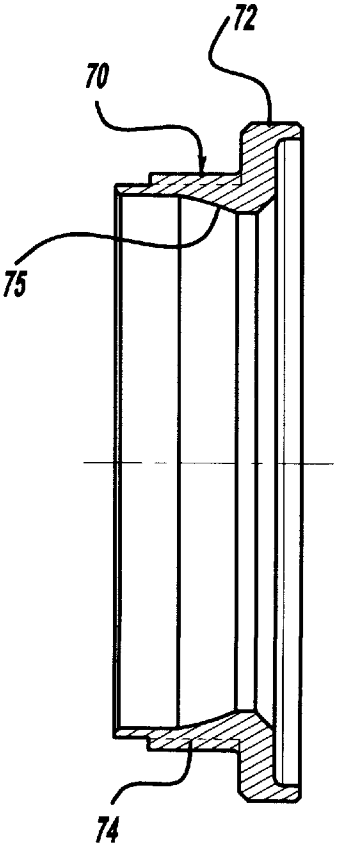
Figure - 20

PIVOTING SLEEVE ASSEMBLY

RELATED APPLICATIONS

This application claims priority from U.S. Provisional Application No. 60/266,607 filed Feb. 6, 2001.

FIELD OF THE INVENTION

This invention relates to a pivoting sleeve for a wall mounted tub/shower valve.

BACKGROUND OF THE INVENTION

The instant invention is a sleeve for use on a tub/shower valve that is mounted in a wall. Generally an escutcheon for a tub/shower valve mounts flush to the wall. Escutcheon screws at the bottom of the escutcheon hold the lower part of the escutcheon in place, but something is required to hold the top of the escutcheon in place. A threaded sleeve with a flange that would abut against the escutcheon may be used. Unfortunately, if the valve is not mounted perfectly perpendicular to the wall there will be a gap between either the top or the bottom of the sleeve flange and the escutcheon if the flange is a rigid part of the sleeve. This is not a problem with the screws as the conical shape of the countersunk heads compensates for any misalignment. Expecting the plumber to mount the valve perfectly perpendicular to the wall is not very realistic, as there are too many variables that the plumber has to contend with, many of which are beyond his control. These include the stringer being twisted or crooked; the bracket on the valve being slightly bent; the brazing of the body not being perfect; and the tub surround being off. The present invention remedies this problem.

SUMMARY OF THE INVENTION

The instant pivoting sleeve assembly comprises a sleeve that is attached, as by threading, to the main body, and that has a male spherical diameter formed in it. The pivot has a female spherical diameter formed in it and forms a pivot joint. A gasket provides the seal between the pivot ring and the tub surround. The escutcheon is placed over the valve mounted into the wall cavity and the main body. The spray assembly is mounted, preferably threadedly, to the main body. As the thread draws the sleeve assembly down, a flange of the pivot ring contacts the escutcheon and pivots to mount flat. The body will be at whatever angle the body is mounted at, but the flange will be flush with the escutcheon. The instant pivoting sleeve assembly allows for a misalignment of at least 4 degrees.

BRIEF DESCRIPTION OF THE DRAWINGS

FIG. 18 is a perspective view of the pivot ring;

FIG. 19 is a top plan view of the pivot ring;

FIG. 20 is a sectional view of the pivot ring taken along line 20—20 in FIG. 19

DESCRIPTION OF THE PREFERRED EMBODIMENT

Figure 1:
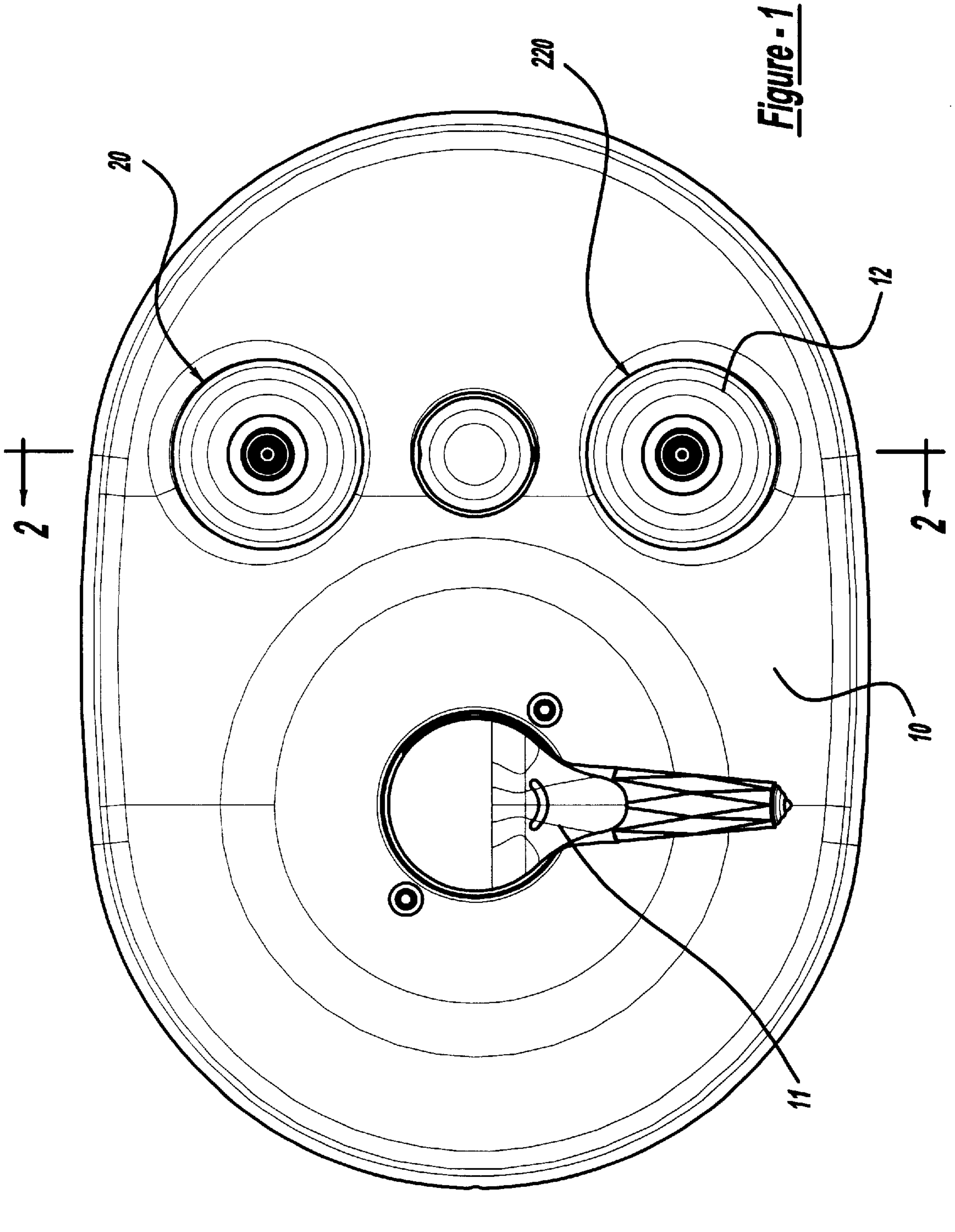
FIG. 1 is a front elevational view of a tub/shower handle and two pivoting sleeves of the instant invention disposed on hot and cold water valves mounted on and in escutcheons.
Figure 2:
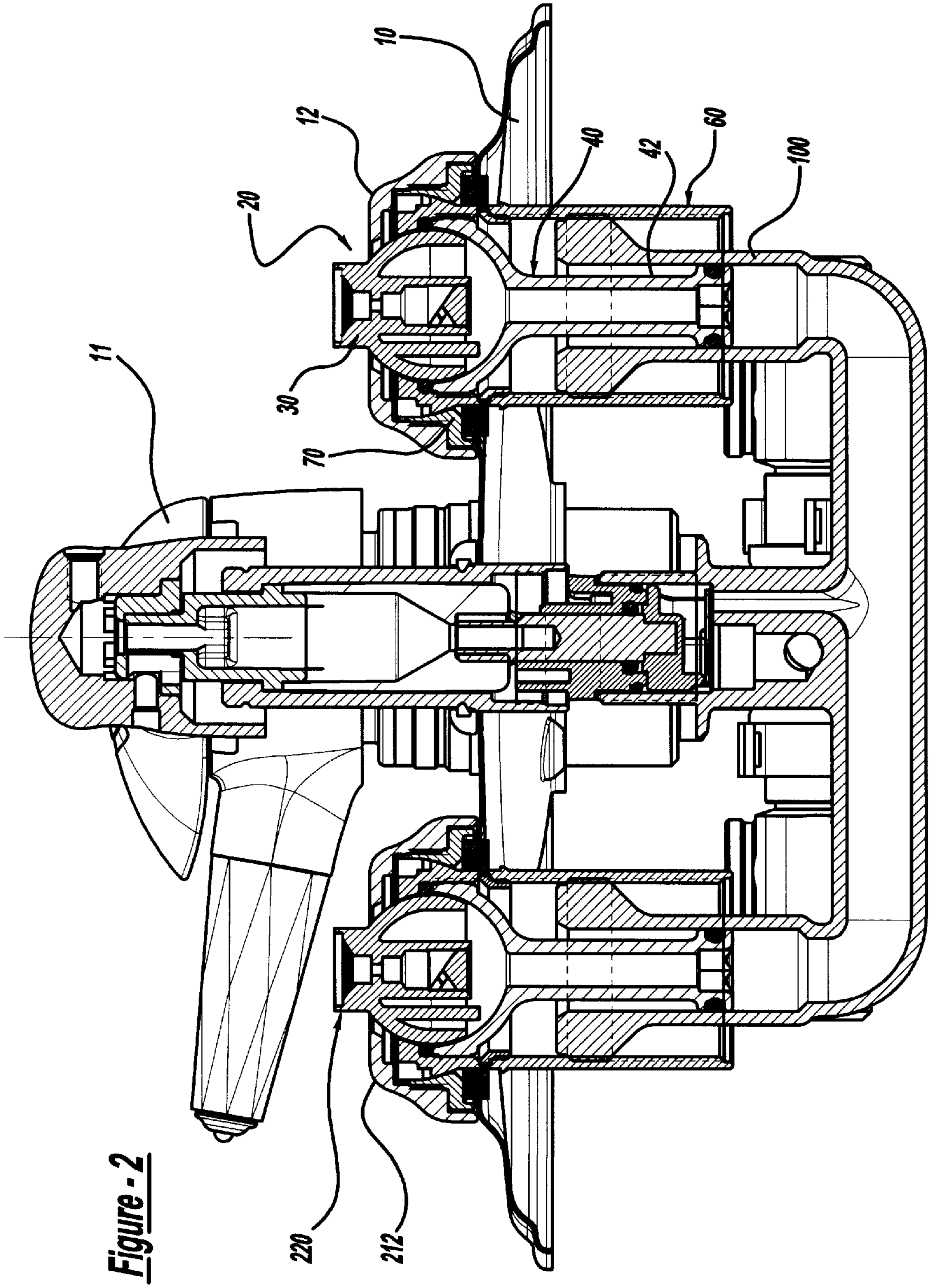
FIG. 2 is a sectional view of FIG. 1 taken along lines 2—2.
Figure 3:
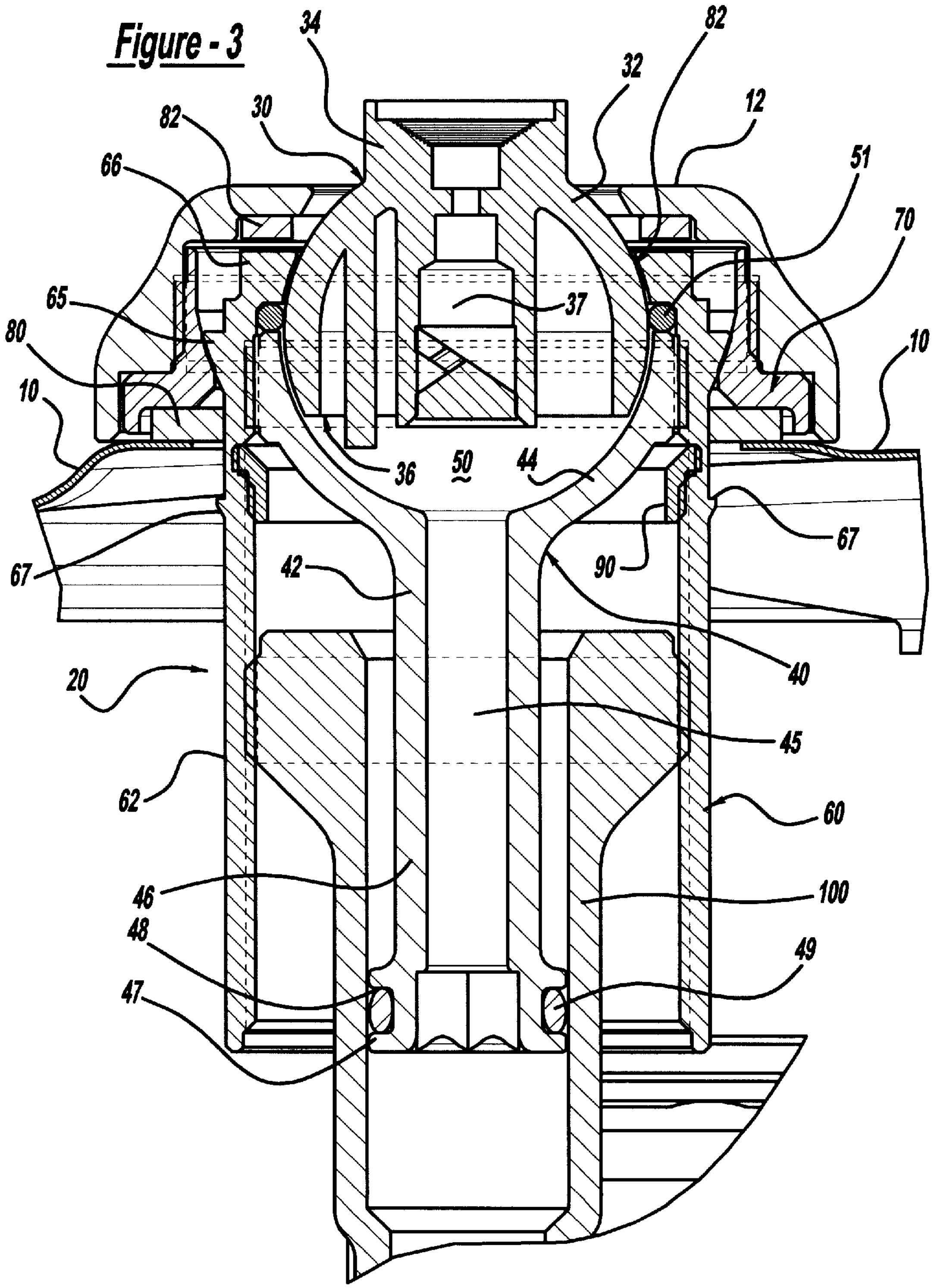
FIG. 3 is an enlarged sectional view of one of the pivoting sleeves and the escutcheons shown in FIG. 2.

In accordance with the instant invention a pivoting sleeve assembly 20, 220, as illustrated in FIGS. 1–3, is employed with an escutcheon 10. The escutcheon 10 may generally be mounted on a wall of a tub or shower. Referring to FIG. 1, a shower assembly is shown having 1, the escutcheon 10, a handle assembly 11, and the pivoting sleeve assemblies 20, 220. A cover plate 12 covers the pivoting sleeve assemblies 20, 220. Although in FIGS. 1 and 2 two pivoting sleeve assemblies 20 and 220 are illustrated, it is to be understood that any number of pivoting sleeve assembly may be present, depending upon the current application. Spouts, body sprays, showerheads, not shown, or other like device may be connected to the pivoting sleeve assemblies in different applications.

Figure 4:
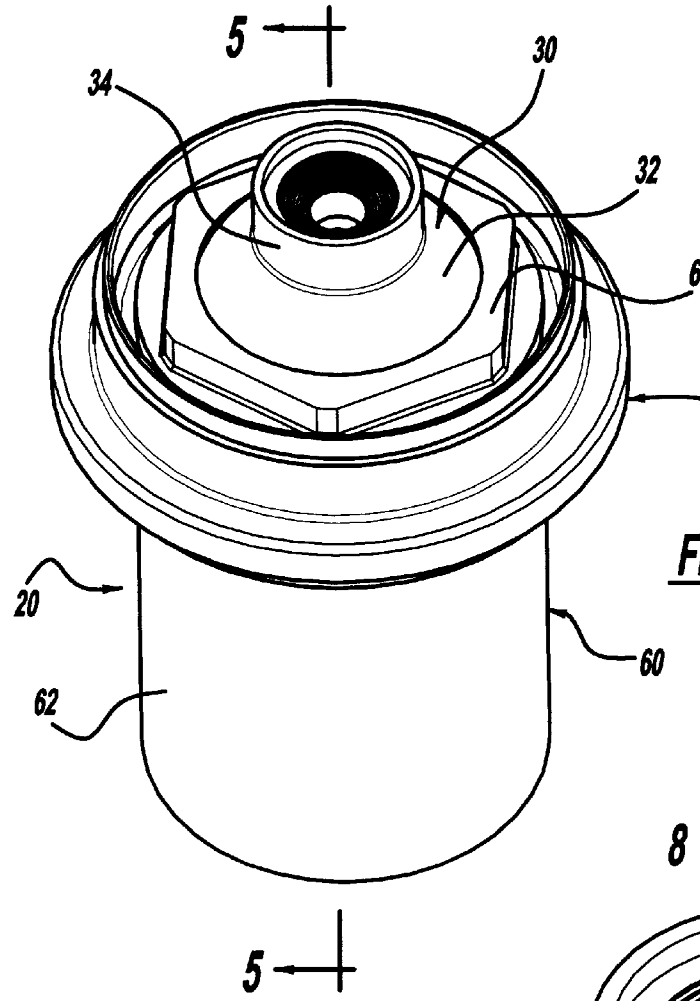
FIG. 4 is a perspective view of the pivoting sleeve assembly of the instant invention.
Figure 7:
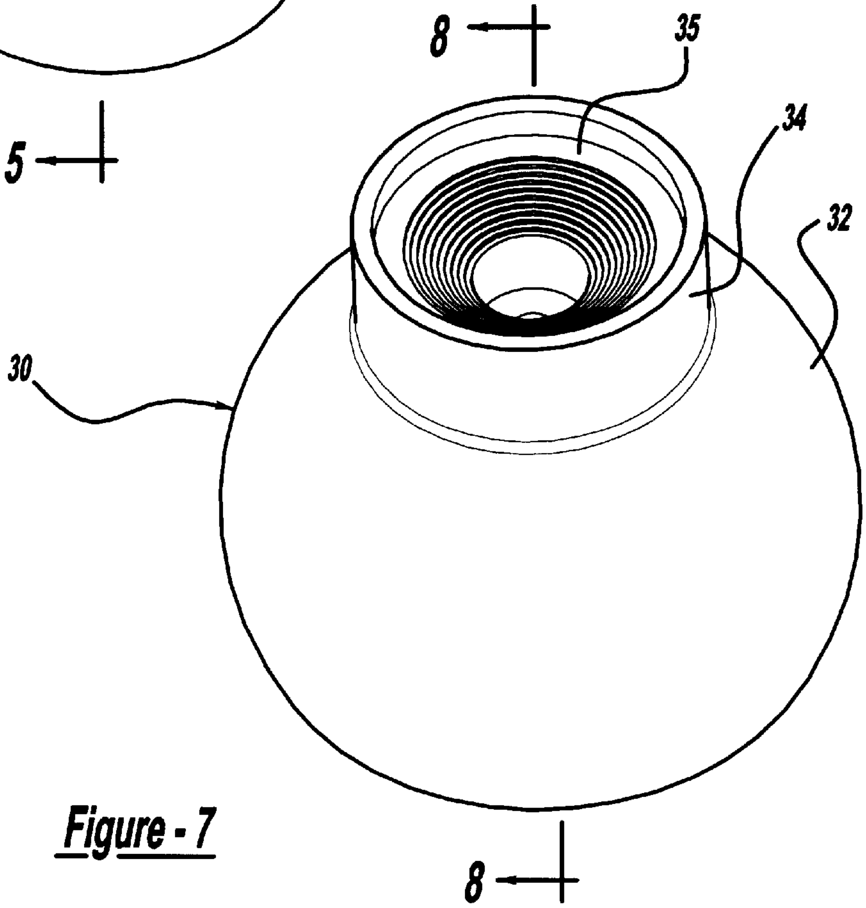
FIG. 7 is a perspective view of the ball.
Figure 8:
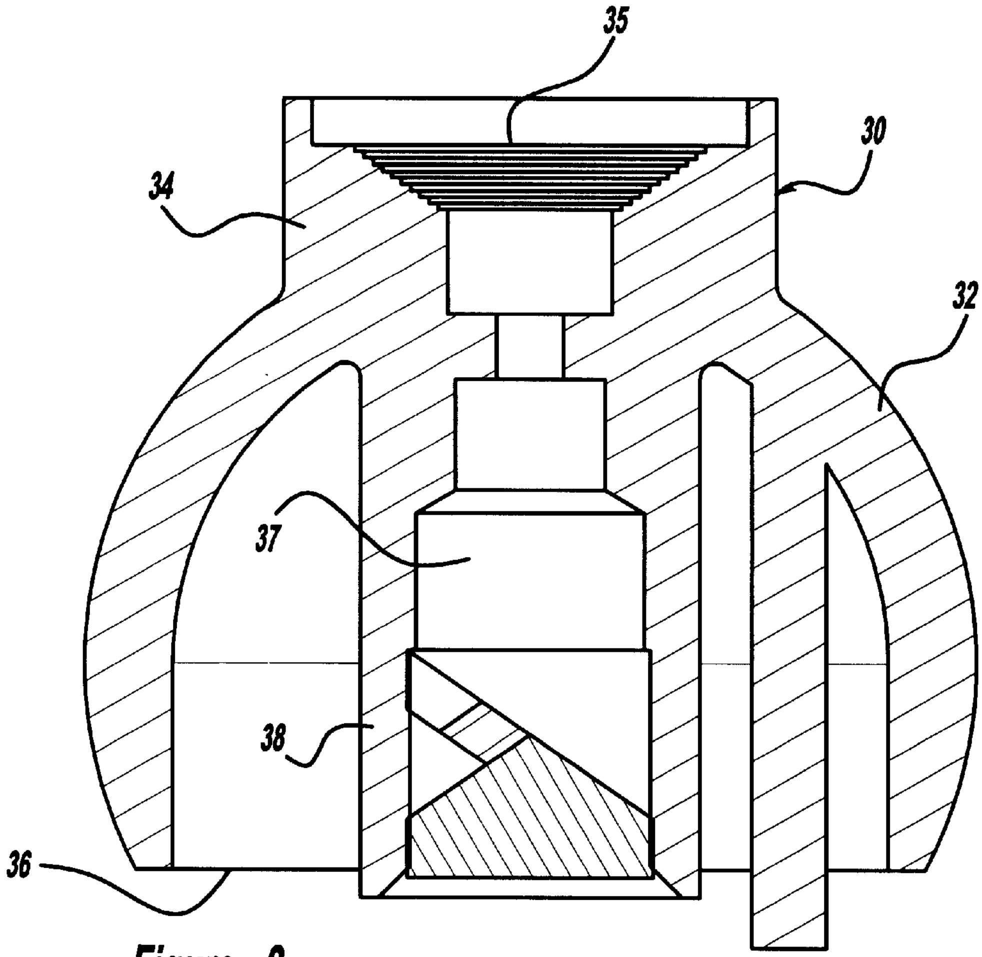
FIG. 8 is a cross sectional view of the ball taken along line 8—8 in FIG. 7.
Figure 9:
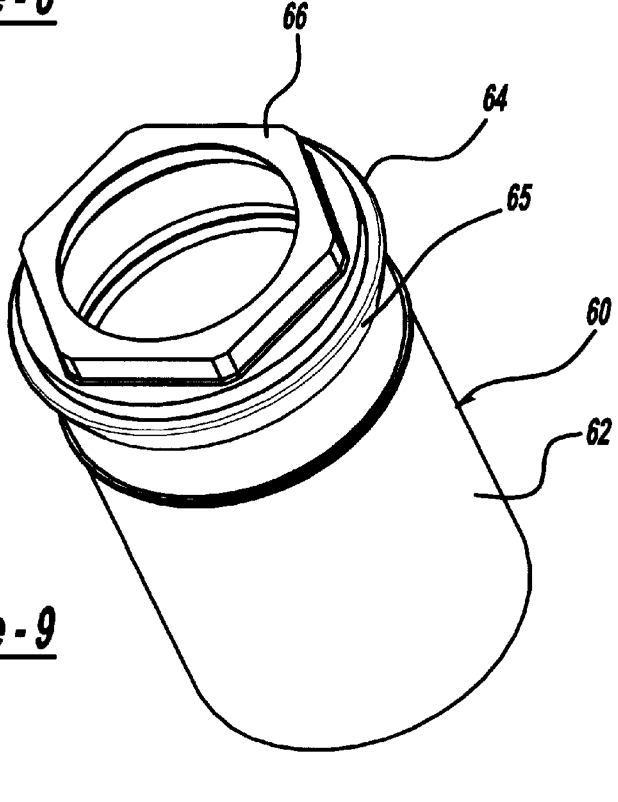
FIG. 9 is a perspective view of the sleeve.
Figure 10:
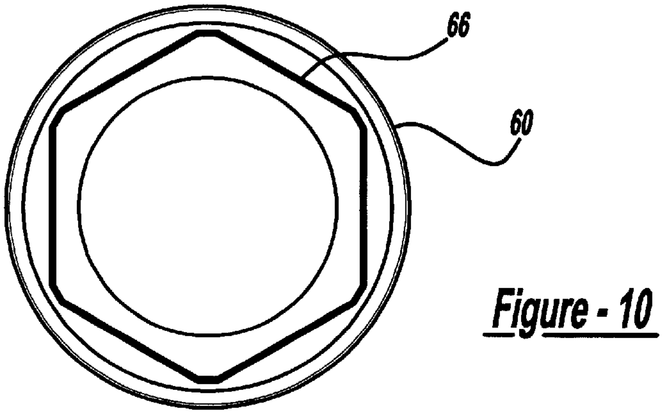
FIG. 10 is a top plan view of the sleeve.
Figure 11:
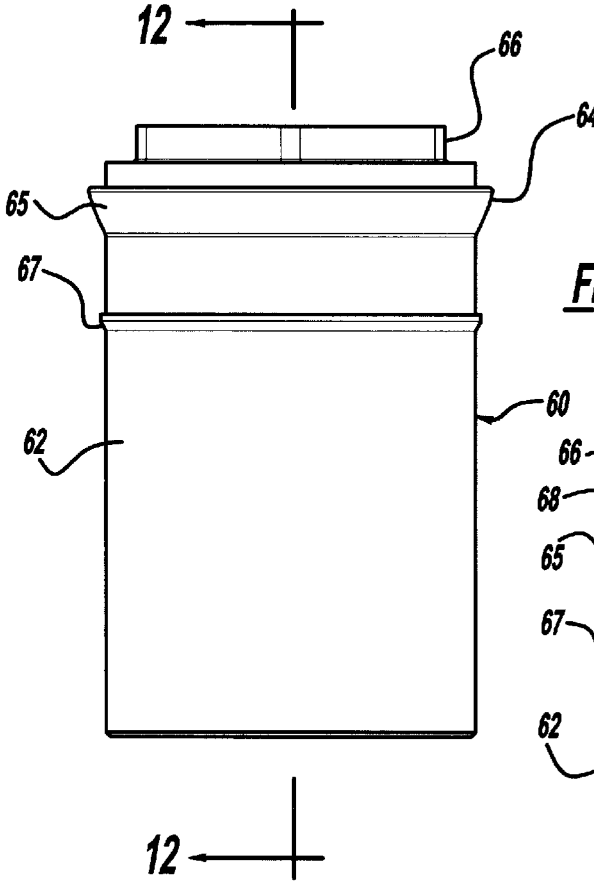
FIG. 11 is a side elevational view of the sleeve.
Figure 12:
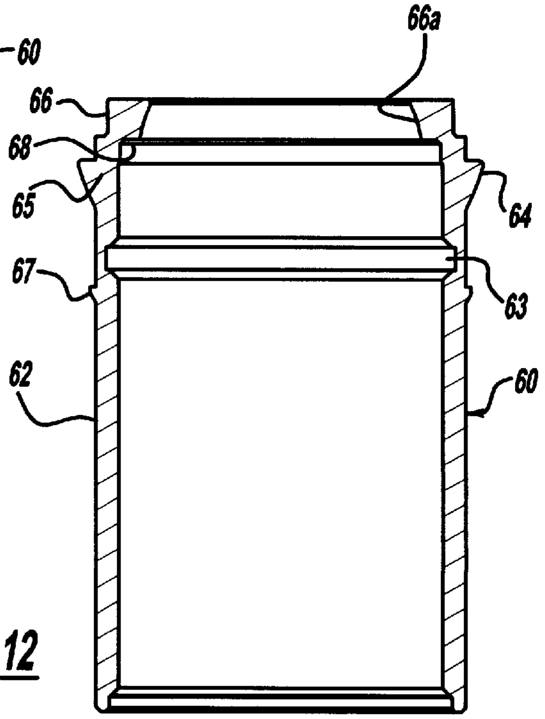
FIG. 12 is a side elevational view in section of the sleeve taken along line 12—12 in FIG. 11.
Figure 13:
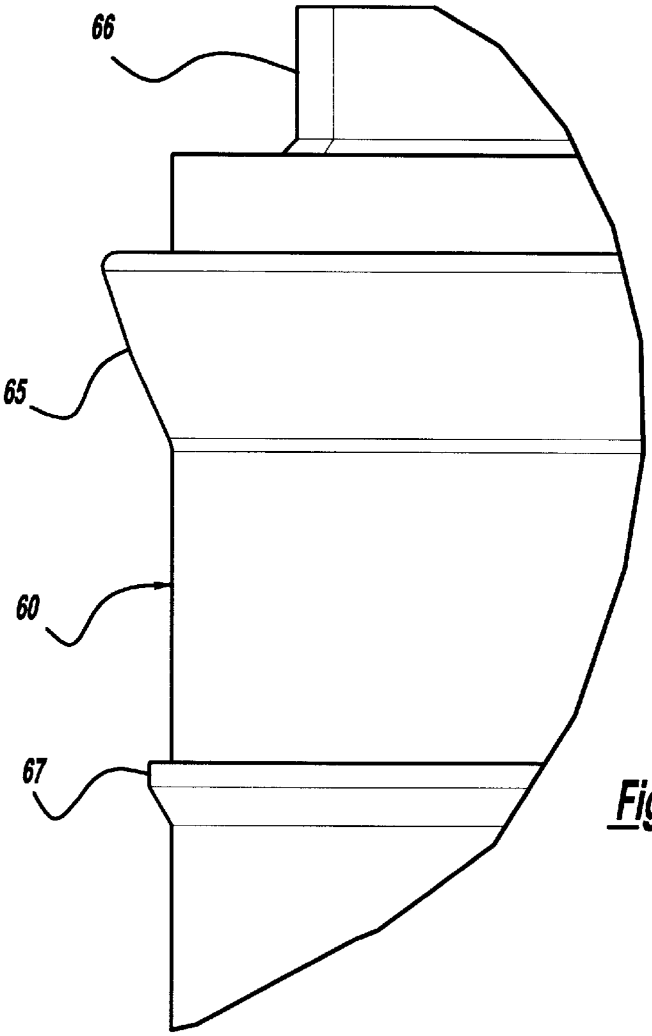
FIG. 13 is an enlarged side elevational view of the top portion of the sleeve shown in FIG. 11.

Referring primarily to FIGS. 3 and 4, the pivoting sleeve assembly 20 is comprised of a ball assembly 30, a ball receptacle 40, a sleeve 60, a pivot ring 70, and a supporting clip 90. As shown in FIGS. 7 and 8, the ball assembly 30 has a generally semi-spherical portion 32 with a truncated base 36 and a neck portion 34 on top. The truncated base 36 is primarily a function of the molding process for forming ball assembly 30. The ball assembly 30 encloses a water passageway 37 formed by a tubular portion 38 extending downwards from the inner surface of the semi-spherical portion 32. In this embodiment of the invention, the tubular portion 38 is integrally molded within the ball assembly 30. The neck portion 34 has an inner surface 35 that opens into the water passageway 37. Although the inner surface 35 has a series of stepped ridges, as shown in FIGS. 7 and 8, this inner surface 35 may be smooth or otherwise contoured, in order to achieve a desired aesthetic appearance or a desired water pattern, when the ball assembly 30 is used as a water output device, such as a spray. Inner surface 35 may also be threaded so as to threadedly receive a spout or showerhead (not shown) if additional water output devices are desired.

The ball assembly 30 is rotatably mounted in the ball receptacle 40, as shown in FIG. 3. The ball receptacle 40 comprises a receiving socket 44 and a downwardly extending hollow stem 42. The receiving socket 44 is semi-spherical in shape for receiving the ball assembly 30. Since the ball assembly 30 has a truncated base 36, a space 50 exists inside the receiving socket 44 and the truncated base 36. The hollow stem 42 extends downwards from the ball receptacle 44 enclosing water passageway 45. The water passage 45 communicates with water passage 37 in ball assembly 30, through space 50. The lower portion 46 of the hollow stem 42 culminates with a plurality of annular ribs 47, forming annular grooves 48 in between each successive rib 47. By way of example, FIG. 3 shows two annular ribs 47 surrounding a single groove 48. An o-ring 49 is placed within groove 48.

Figure 14:
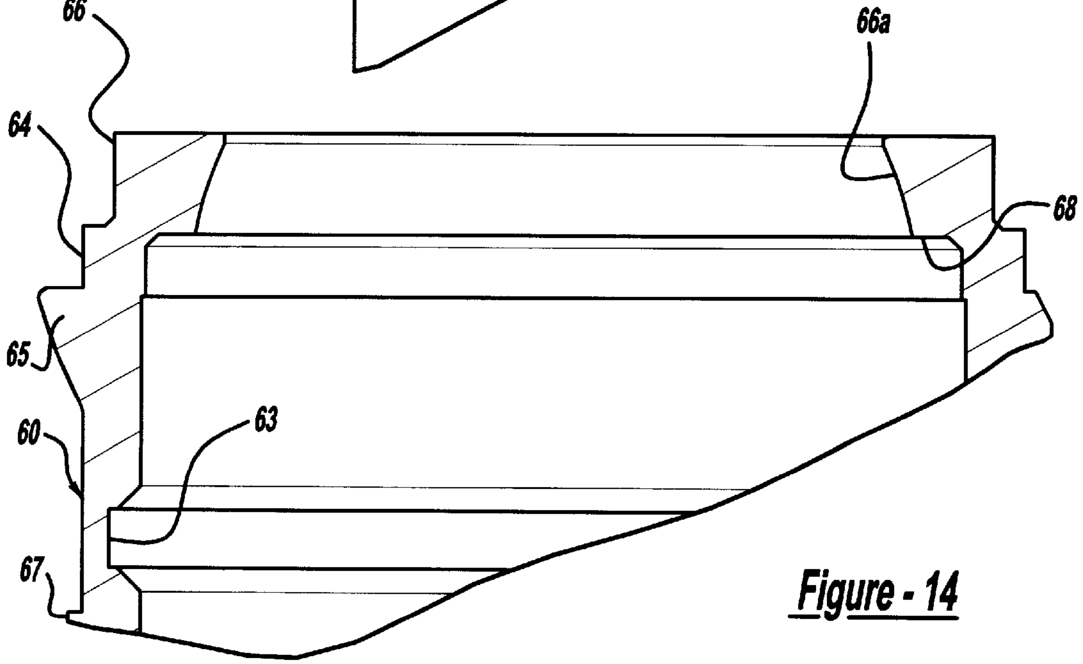
FIG. 14 is an enlarged side elevational view in section of the top portion of the sleeve shown in FIG. 12.
Figure 15:
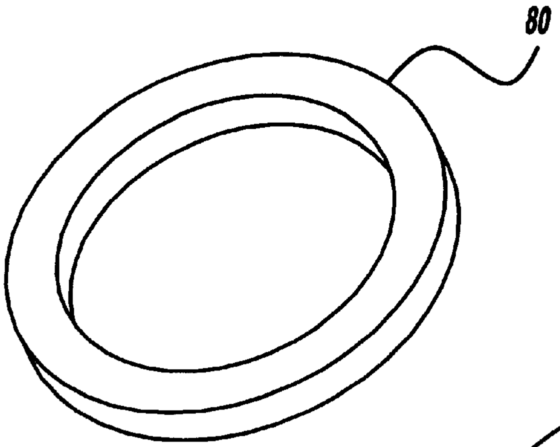
FIG. 15 is a perspective view of the sleeve seal.
Figure 16:
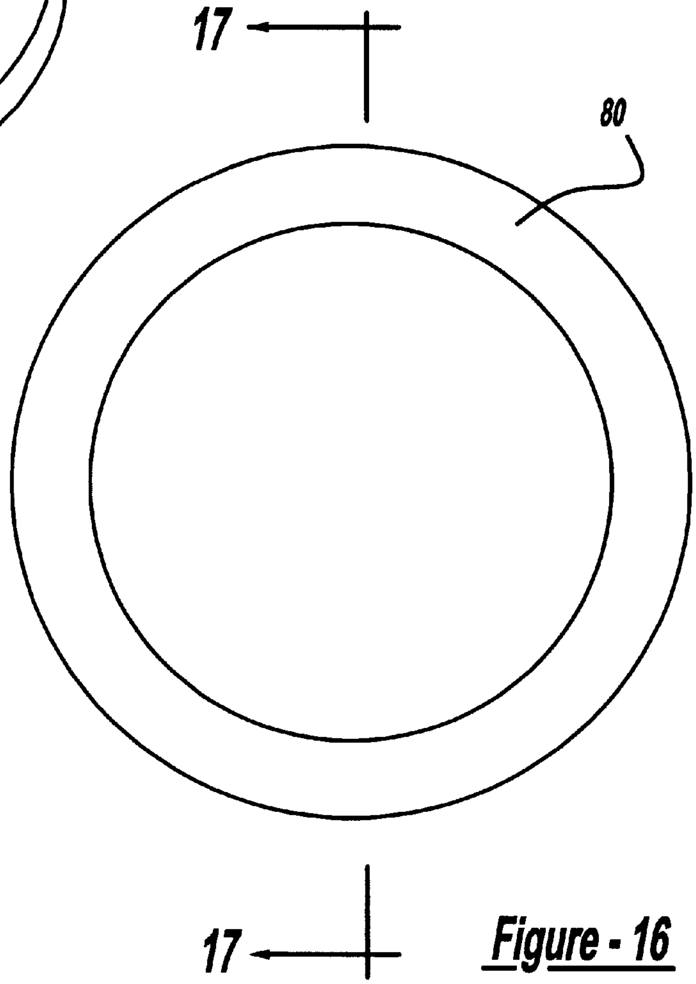
FIG. 16 is a top plan view of the sleeve seal.
Figure 17:
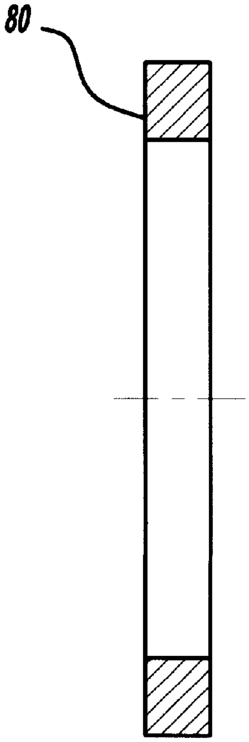
FIG. 17 is a sectional view of the sleeve seal taken along line 17—17 in FIG. 16.
Figure 21:
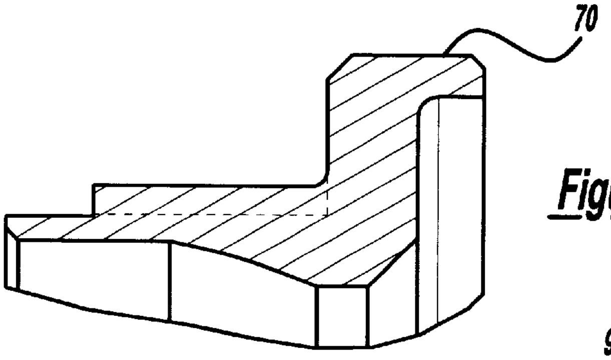
FIG. 21 is an enlarged view in section of a portion of the pivot ring shown in FIG. 20.
Figure 22:
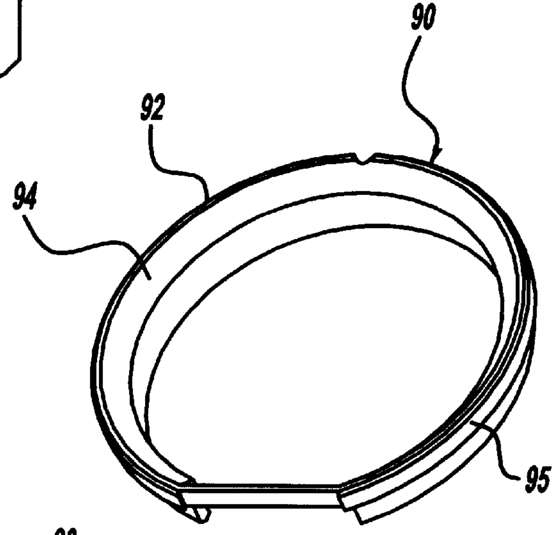
FIG. 22 is a perspective view of the retainer clip.
Figure 23:
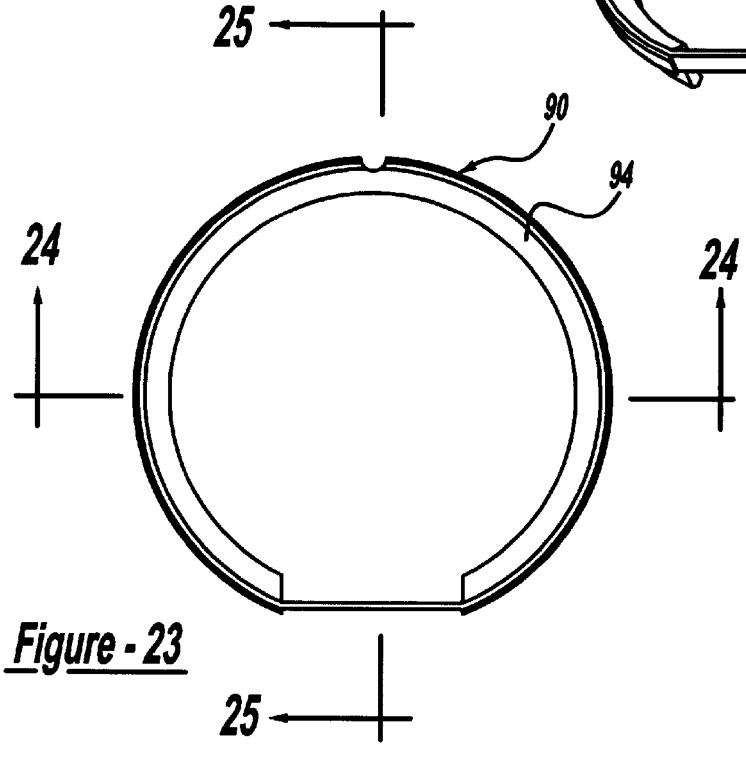
FIG. 23 is a top plan view of the retainer clip.
Figure 24:
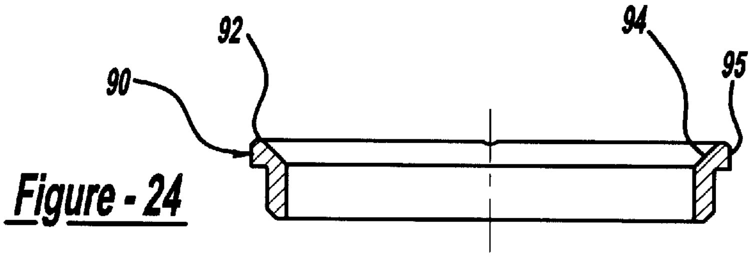
FIG. 24 is a sectional view of the retainer clip taken along line 24—24 in FIG. 23.
Figure 25:
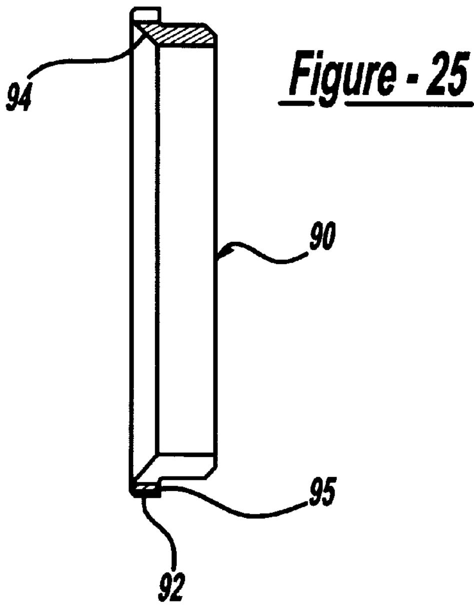
FIG. 25 is a sectional view of the retainer clip taken along line 25—25 in FIG. 23.

The sleeve 60 surrounds the ball assembly 30 and ball receptacle 40, as shown in FIG. 3. Referring to FIGS. 9–12, sleeve 60 comprises a lower tubular portion 62 and a top stepped portion 64. The lower tubular portion 62 contains an annular node 67 that extends outwards from the outer surface of tubular portion 62. Prior to assembling the pivoting sleeve assembly 20, annular node 67 serves to retain gasket 80 and pivoting ring 70 on sleeve 60. At some axial distance from the annular node 67, and within the section described as the top stepped portion 64, there is situated an outwardly and upwardly from extending annular ridge 65. On top of the stepped portion 64 is a hexagonal section 66 adapted to accept a wrench or the like. Referring to FIG. 14, the inner surface 66*a* of the hexagonal section 66 is rounded so as to conform to the contour of the ball assembly 30. The junction between the inner surface of annular ridge 65 and the under surface of hexagonal section 66 forms a shoulder 68. Also, located below the annular ridge 65, an annual groove 63 is carved into the inner surface of the lower tubular portion 62. The annual groove 63 is for receiving supporting clip 90, as will be discussed further below.

Figure 26:
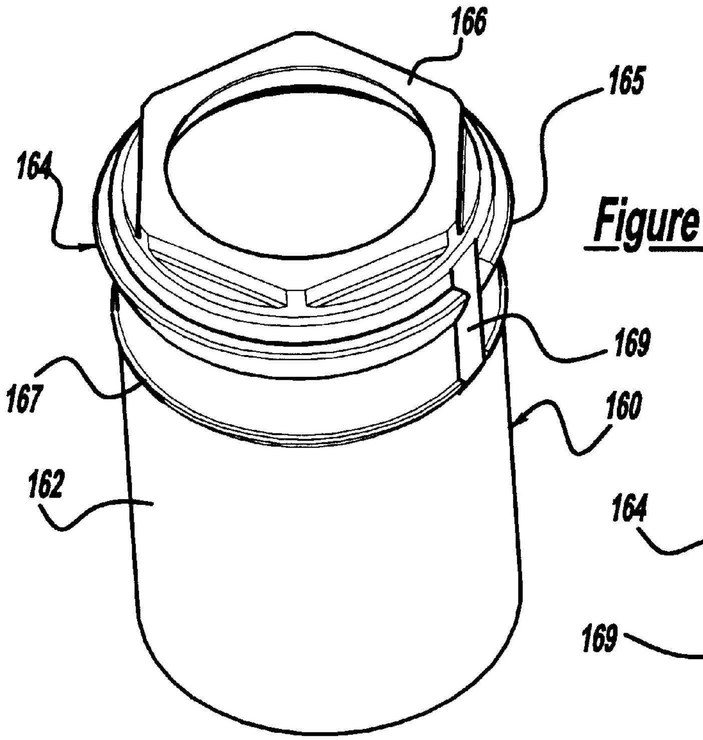
FIG. 26 is a perspective view of a second embodiment of the sleeve with a vertical notch or slot present in the top of the sleeve.
Figure 27:
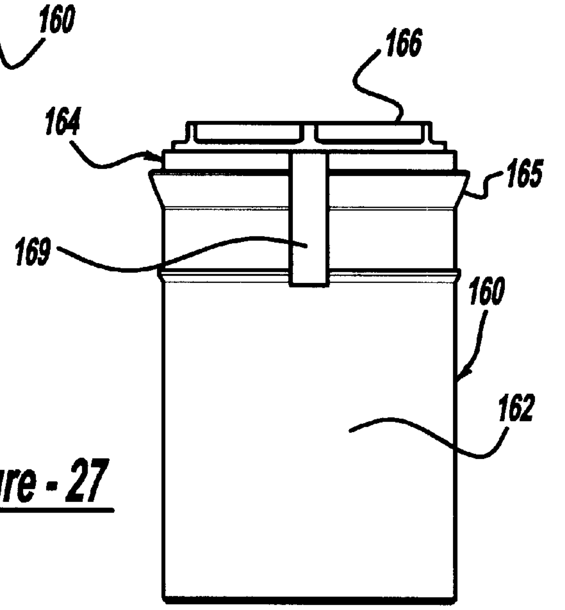
FIG. 27 is a side elevational view of this second embodiment of the sleeve.
Figure 28:
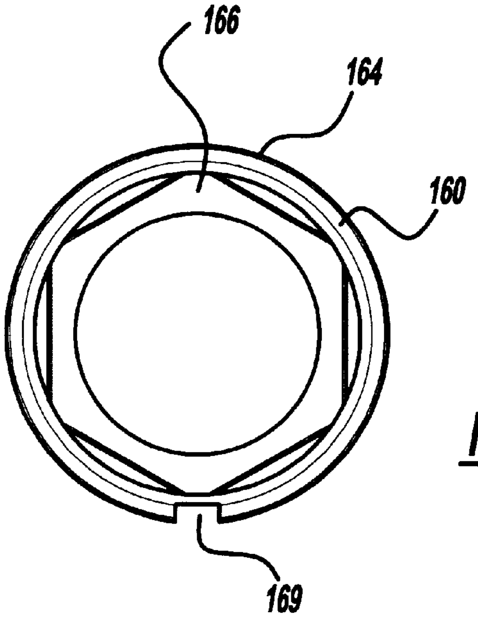
FIG. 28 is a top plan view of this second embodiment of the sleeve.

In an alternative embodiment of the sleeve 160, as shown in FIGS. 26 through 28, a vertically extending slot 169 runs along the outside surface of sleeve 160. As shown in FIGS. 26 and 27, the slot 169 may be located primarily in the top stepped portion 164. The slot 169 runs approximately from the annular node 167 and up through the annular ridge 165.

In another embodiment of the invention, sleeve 60 may have a threaded interior surface that corresponds to threads on the exterior surface of receiving socket 44 of ball receptacle 40. This allows ball receptacle 40 to be threadedly secured within sleeve 60.

Placed on top of the sleeve 60 is pivot ring 70. Pivot ring 70 serves to secure the pivoting sleeve assembly 20 in place, while allowing the entire pivoting sleeve assembly 20 to align the valve with the wall. As shown in FIGS. 18 through 21, the pivot ring 70 has a base section 72. Extending upwards from base section 72 is a generally tubular section 74. Tubular section 74 has a smaller diameter than base section 72. The inner surface 75 of tubular section 74 is generally arcuate in shape to conform to the outer surface shape of annular ridge 65 of sleeve 60. This allows pivot ring 70 to pivot around sleeve 60 about the annular ridge 65. The external surface of tubular section 74 of pivot ring 70 may contain external threads to threadedly attach to a cover plate 12 (see FIG. 3).

Figure 29:
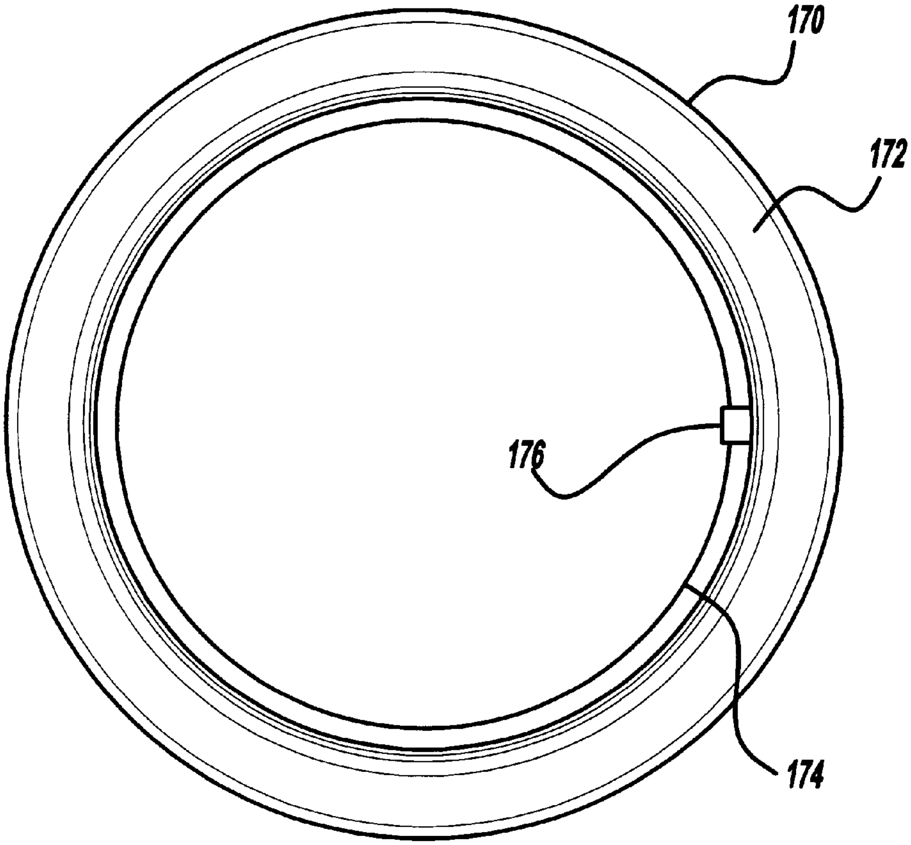
FIG. 29 is a top plan view of a second embodiment of the pivot ring having a tab thereon which engages the vertical slot in the second embodiment of the sleeve.

FIG. 29 illustrates an alternative embodiment of the invention, in which a vertically extending tab 176 is placed along the inner surface of pivot ring 170. Tab 176 engages slot 169 of sleeve 160, thereby locking together pivot ring 170 with sleeve 160. With tab 176 inserted into the slot 169, the pivot ring 170 is prevented from spinning or rotating on or relative to the sleeve 160 during assembly or disassembly. Although this embodiment is illustrated with one slot and tab configuration, a plurality of slots and tabs or other locking devices may be employed.

Supporting clip 90 is disposed within sleeve 60 and serves to retain ball receptacle 40 within the sleeve 60. Although a supporting clip 90 is shown, a threaded nut or other supporting device may be used. Referring to FIGS. 22 through 25, supporting clip 90 has an annular configuration and fits within the sleeve 60. The upper part 92 of supporting clip 90 has a shaped interior surface 94 that cradles the bottom of receiving socket 44 of ball receptacle 40. The exterior surface of the upper part 92 of supporting clip 90 forms an outwardly extending lip 95 that fits into annual groove 63 of sleeve 60, thereby securing supporting clip 90 within the sleeve 60.

Referring to FIGS. 3 and 15 through 17, an annular gasket 80 is placed around sleeve 60, between the escutcheon 10 and pivot ring 70. Annular node 67 of sleeve 60 keeps gasket 80 from sliding down the tubular portion 62 of sleeve 60 prior to assembly. Gasket 80 provides a seal between pivot ring 70 and escutcheon 10. Although the gasket 80 is shown having a square or rectangular cross-section, any appropriately sized gasket may be employed. Preferably, the gasket 80 is made from a cross-linked polyethylene foam material.

Figure 6:
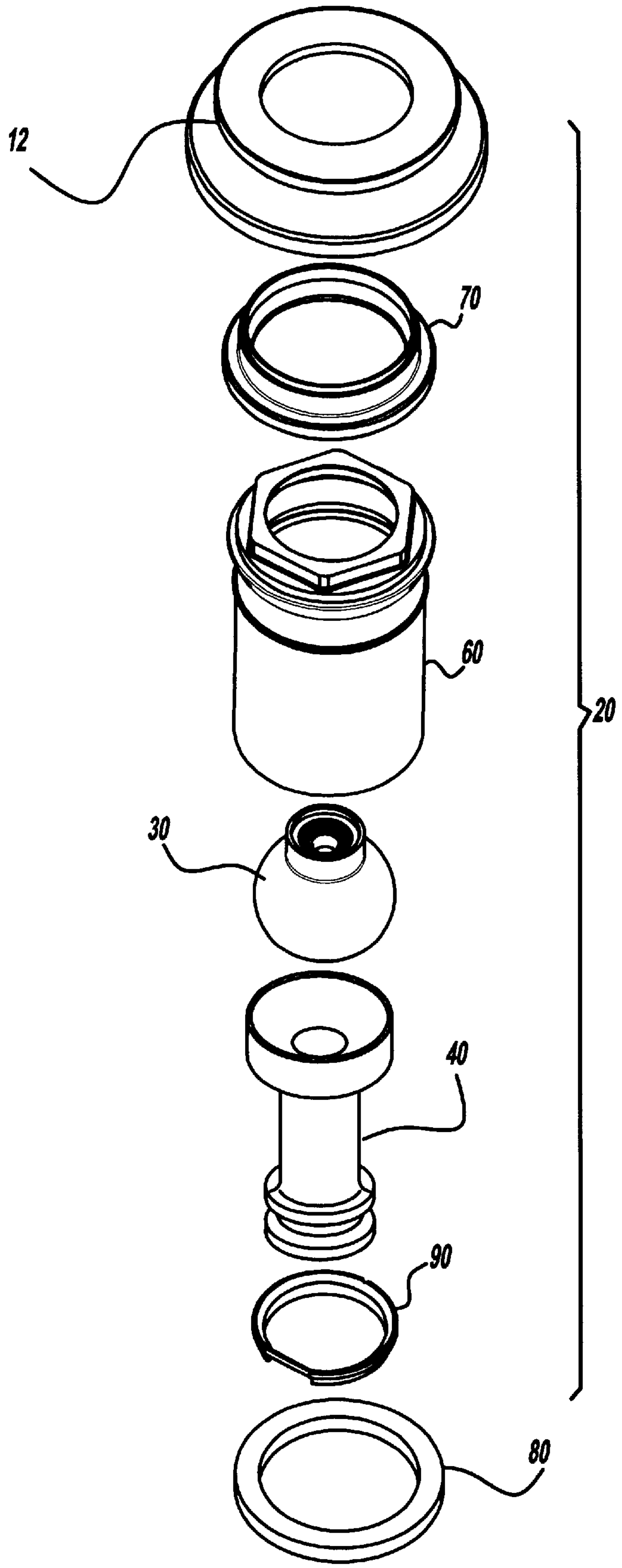
FIG. 6 is an exploded perspective view of the pivoting sleeve assembly of the instant invention.

Referring now to FIGS. 3 and 6, the pivoting sleeve assembly 20 is assembled by first placing ball assembly 30 into ball receptacle 40. Ball receptacle 40 is then inserted into sleeve 60 and retained in place by supporting clip 90. In the embodiment where the inner surface of the sleeve 60 contains screw threads, ball receptacle 40 is threaded into sleeve 60. An O-ring 51 is placed between the upper edge of ball receptacle 40 and against shoulder 68 along the bottom surface of hexagonal section 66 of sleeve 60. O-ring 51 provides a seal between the exterior surface of the semi-spherical portion 32 of the ball assembly 30, receiving socket 44 of holder 40, and the inner surface of stepped portion 64 of sleeve 60. Thus, O-ring 51 prevents fluid leakage around the ball assembly 30. The ball receptacle 40 is then placed into pivot ring 70 such that the annular ridge 65 rests along inner surface 75 of pivot ring 70. In the embodiment shown in FIGS. 26 through 29, vertically extending tab 176 of pivot ring 170 is aligned with slot 169 of sleeve 160, as sleeve 160 is inserted within pivot ring 170.

Although not shown in FIG. 6, a cover plate 12 is secured over pivot ring 70. This provides a decorative cover to the pivoting sleeve assembly 20. In a preferred embodiment, the cover plate 12 is threadedly attached to the pivot ring 70. A washer 82 is placed between the cover plate 12 and the top surface of the hexagonal section 66 of sleeve 60. This washer 82 provides additional sealing between cover plate 12 and sleeve 60.

The pivoting sleeve assembly 20 may now be installed as best shown in FIGS. 2 and 3. Sleeve 60, with gasket 80 already in place about sleeve 60, is inserted into a given aperture within escutcheon 10. Sleeve 60 is attached over a water conduit or pipe 100 while the lower portion 46 of hollow stem 42 of ball receptacle 40 is inserted into the water conduit 100. O-ring 49 provides a seal between the stem 42 and the conduit 100. The gasket 80 rests on top of the escutcheon 10, between escutcheon 10 and pivot ring 70. As the cover plate is attached over pivot ring 70, the pivoting sleeve assembly 20 is secured to the escutcheon 10, with gasket 80 being compressed as necessary to prevent any unwanted movement between the pivoting sleeve assembly 20 and the escutcheon 10. In order to disassemble the pivoting sleeve assembly, the cover plate 12 is removed and a wrench may be placed around hexagonal section 66 of sleeve 60 in order to remove the sleeve 60 from conduit 100. Clip 90 prevents the ball receptacle 40 from becoming displaced as sleeve 60 is removed from conduit 100.

Figure 5A:
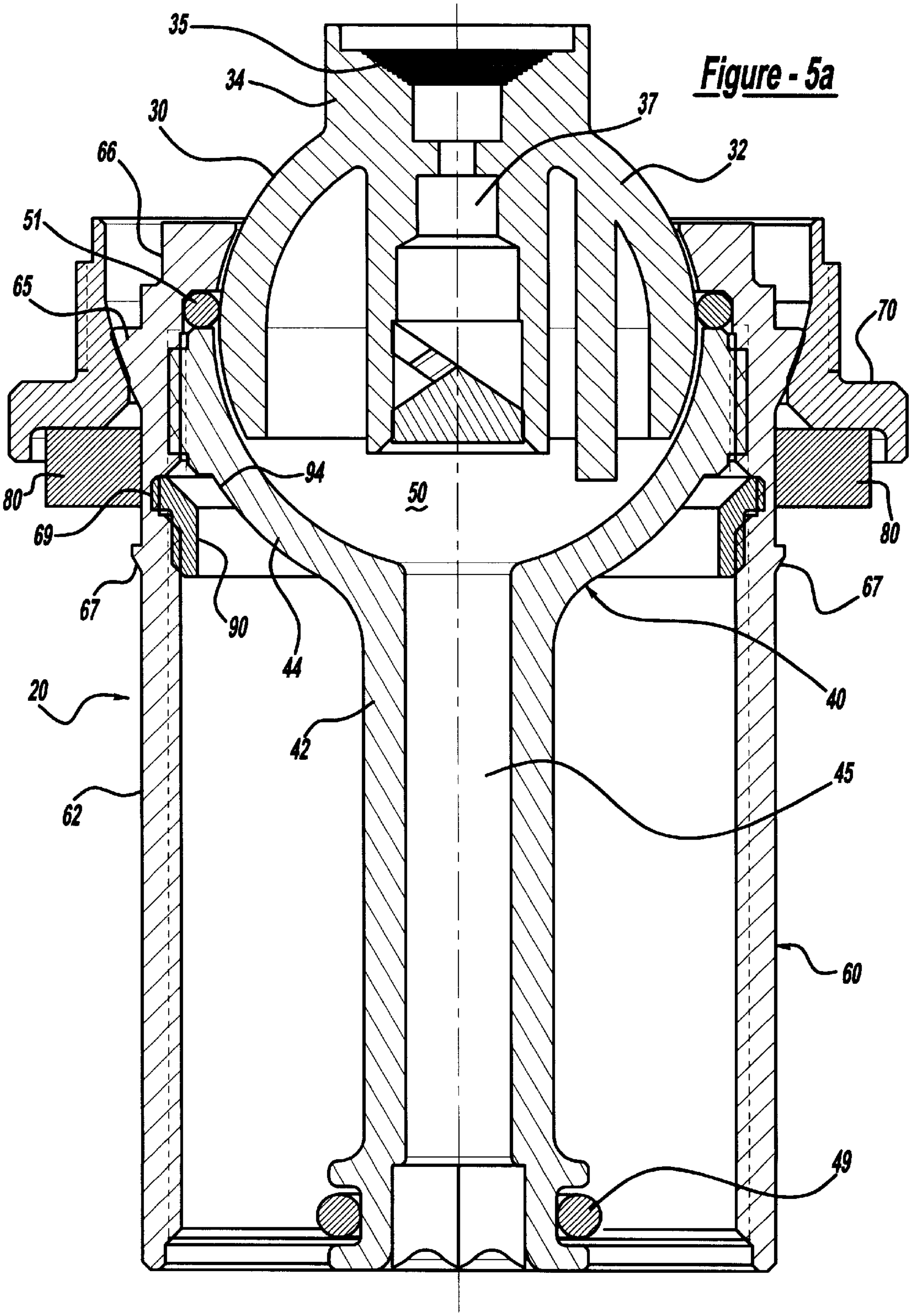
FIG. 5*a* is a cross sectional view of the pivoting sleeve assembly taken along line 5—5 in FIG. 4 with the sleeve in a vertical position and the pivot ring in a non-pivoted position.
Figure 5B:
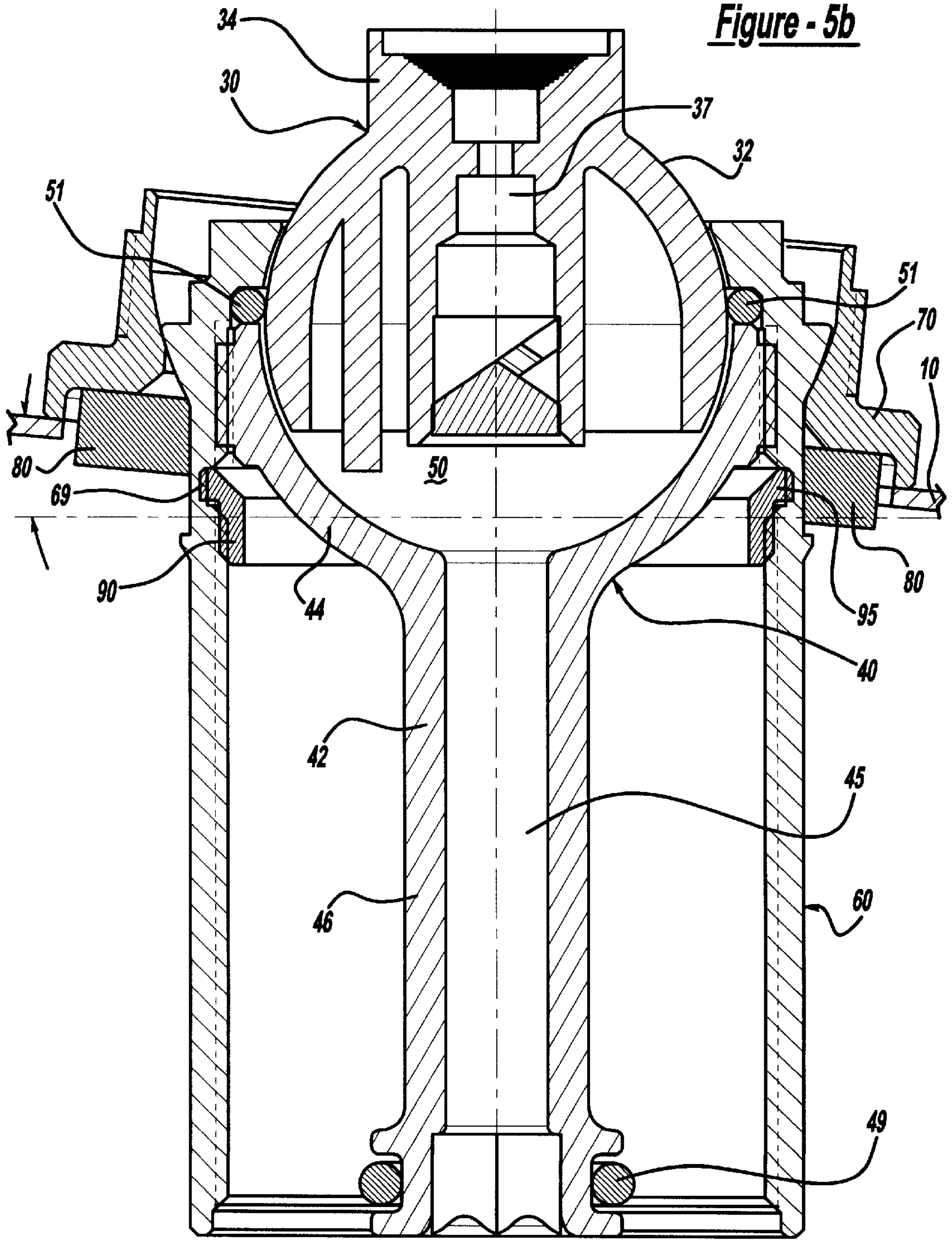
FIG. 5*b* is a view similar to FIG. 5*a* except that the pivot ring is pivoted to the right relative to its position in FIG. 5*a;*
Figure 5C:
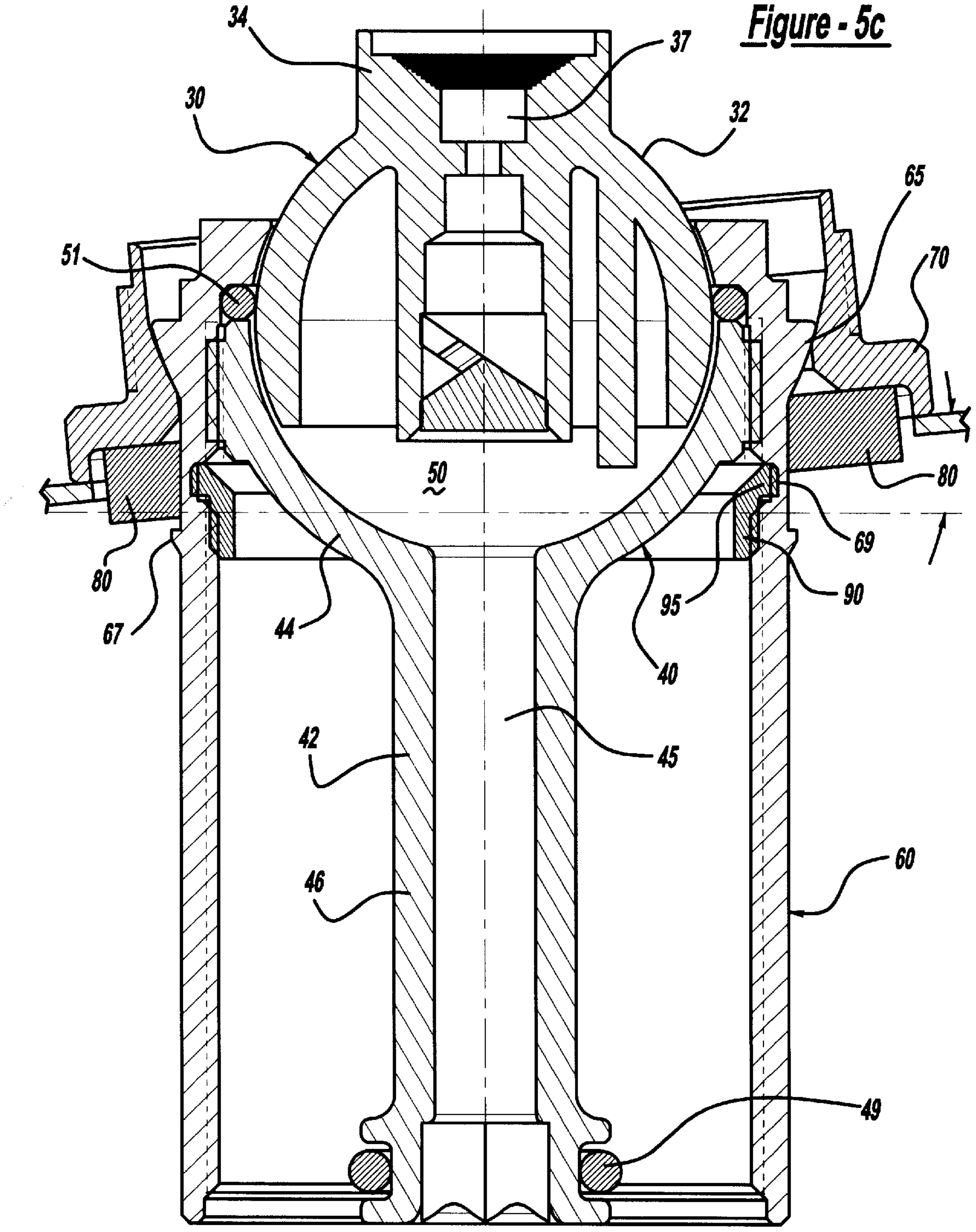
FIG. 5*c* is a view similar to FIG. 5*a* except that the pivot ring is pivoted to the left relative its position in FIG. 5*a;*

As shown in FIGS. 5*a* through 5*c*, the pivoting sleeve assembly 20 aligns itself and remains flush with the wall, even when the wall is at a slight angle and not perpendicular. As shown, the sleeve 60 pivots within pivot ring 70. Pivot ring 70, in turn, tilts relative to the wall, allowing the assembly 20 to appear flush with the escutcheon 10 as mounted on the wall.

While the invention has been described in what is considered to be a preferred embodiment, other variations and modifications will become apparent to those skilled in the art. It is intended, therefore, that the invention not be limited to the illustrative embodiment but be interpreted within the full spirit and scope of the appended claims.

What is claimed is:

1. A pivoting sleeve assembly comprising:

a ball assembly having a semi-spherical outer surface and a central fluid passageway running therethrough;

a ball receptacle for receiving and supporting the ball assembly, the ball receptacle having a hollow lower tubular portion, and a semi-spherical upper portion, the upper portion conforming to the contours of the ball assembly, the central passageway of the ball assembly being in fluid communication with a fluid passageway running through the lower tubular portion and the upper portion of the ball receptacle;

a sleeve, attached to and surrounding the ball receptacle, the sleeve having an inner surface and an outer surface, and having a lower tubular portion and an upper arcuate portion, the arcuate portion curving upwards and outwards from the top of the lower tubular portion; and an annular pivot ring having an outer surface and an inner surface, the inner surface having an arcuate shape to conform to the shape of the upper arcuate portion of the sleeve, so that the sleeve may pivot within the contours of the pivot ring.

2. The pivoting sleeve assembly as described in claim 1, wherein the ball assembly is formed as an integral unit via an injection molding process.

3. The pivoting sleeve assembly as described in claim 2, wherein the upper portion of the ball receptacle contains screw threads for the threaded attachment to the sleeve, and wherein the lower tubular portion, having a top, end adjacent to the upper portion of the sleeve, and a bottom end, the bottom end having a plurality of annular ribs attached thereon, the annular ribs extending outwards to surround a plurality of annular grooves.

4. The pivoting sleeve assembly as described in claim 3, further comprising a plurality of O-rings placed within the annular grooves of the lower tubular portion of the ball receptacle.

5. The pivoting sleeve assembly as described in claim 4, wherein the inner surface of the sleeve contains screw threads thereon for the threaded attachment to the ball receptacle, such that the ball receptacle may be removed from and reattached within the sleeve.

6. The pivoting sleeve assembly as described in claim 5, further comprising a hexagonal top section integral with and extending upwards from the upper arcuate portion of the sleeve.

7. The pivoting sleeve assembly as described in claim 6, wherein the inner surface of the lower tubular portion of the sleeve contains an annular groove located at a point below the ball receptacle, and wherein the outer surface of the lower tubular portion of the sleeve contains an annular node.

8. The pivoting sleeve assembly as described in claim 7, further comprising an annular supporting clip having an outwardly extending lip that engages the annular groove along the inner surface of the sleeve, thereby preventing the ball receptacle from passing below the supporting clip when the supporting clip is installed.

9. The pivoting sleeve assembly as described in claim 8, further comprising a cover plate, the cover plate being threadedly attached to the pivot ring.

10. The pivoting sleeve assembly as described in claim 9, further comprising an annular gasket that is sized to provide a sealing fit with the outer diameter of the tubular portion of the sleeve, such that, as the cover plate is attached over the pivot ring, the gasket is compressed between the cover plate and a sealing surface.

11. The pivoting sleeve assembly as described in claim 6, wherein the outer surface of the upper arcuate portion of the sleeve contains a vertically extending groove, and wherein the inner surface of the annular pivot ring contains an inwardly extending vertical tab, such that, as the sleeve is inserted through the pivot ring, the vertical tab seats within the vertically extending groove on the sleeve.

12. The pivoting sleeve assembly as described in claim 1, wherein the ball assembly is a fluid delivery device.

13. The pivoting sleeve assembly as described in claim 1, wherein the ball assembly is a shower spray.

14. The pivoting sleeve assembly as described in claim 2, wherein the central passageway of the ball assembly, having a wall encircling the passageway, extends upwards through a top portion of the ball assembly, and wherein the top portion of the wall is threaded so as to receive a fluid delivery device.

15. The pivoting sleeve assembly as described in claim 5, wherein the pivoting sleeve assembly is attached to a fluid supply having a fluid connector, by attaching the sleeve to the fluid connector.

16. The pivoting sleeve assembly as described in claim 15, wherein the lower tubular portion of the ball receptacle is inserted within the fluid connector such that the plurality of O-rings placed within the annular grooves on the lower tubular portion provide a seal between the fluid connector and the ball receptacle, thus providing a fluid passageway from the fluid supply through the ball receptacle and through the ball assembly.

17. A pivoting sleeve assembly for aligning a fluid delivery device perpendicular to a mounting surface when the fluid delivery device is mounted to a wall, the pivoting sleeve assembly comprising:

a fluid delivery device attached to a fluid supply;

a sleeve, attached to and surrounding the fluid delivery device, the sleeve having an inner surface and an outer surface, and having a lower tubular portion and an upper arcuate portion directly above the lower tubular portion, the arcuate portion curving upwards and outwards from the top of the lower tubular portion;

an annular pivot ring having an outer surface and an inner surface, the inner surface having an arcuate shape to conform to the shape of the upper arcuate portion of the sleeve, so that the sleeve may pivot within the contours of the pivot ring, thereby orienting the fluid delivery device for proper mounting to the surface; and a cover plate being threadedly attached to the pivot ring.

18. The pivot ring assembly as described in claim 17, wherein the fluid delivery device is a shower spray.

* * * * *